United States Patent
Gal et al.

(10) Patent No.: US 9,027,476 B2
(45) Date of Patent: May 12, 2015

(54) LASER-ENGRAVEABLE FLEXOGRAPHIC PRINTING PRECURSORS AND METHODS OF IMAGING

(75) Inventors: Ido Gal, Kafar-Saba (IL); Ophira Melamed, Shoham (IL)

(73) Assignee: Eastman Kodak Company, Rochester, NY (US)

( * ) Notice: Subject to any disclaimer, the term of this patent is extended or adjusted under 35 U.S.C. 154(b) by 831 days.

(21) Appl. No.: 13/245,893

(22) Filed: Sep. 27, 2011

(65) Prior Publication Data

US 2013/0074718 A1 Mar. 28, 2013

(51) Int. Cl.
- *B41N 1/12* (2006.01)
- *B41C 1/05* (2006.01)
- *C08L 23/16* (2006.01)
- *C08K 3/04* (2006.01)
- *C08L 77/00* (2006.01)
- *C08L 61/06* (2006.01)

(52) U.S. Cl.
CPC ... *B41C 1/05* (2013.01); *B41N 1/12* (2013.01); *C08K 3/04* (2013.01); *C08L 23/16* (2013.01); *C08L 77/00* (2013.01); *C08L 61/06* (2013.01)

(58) Field of Classification Search
CPC ......................................................... B41N 1/12
USPC ....................................................... 101/395
See application file for complete search history.

(56) References Cited

U.S. PATENT DOCUMENTS

| | | | |
|---|---|---|---|
| 4,272,608 A | 6/1981 | Proskow | |
| 5,719,009 A | 2/1998 | Fan | |
| 5,804,353 A | 9/1998 | Cushner et al. | |
| 6,776,095 B2 | 8/2004 | Telser et al. | |
| 6,913,869 B2 | 7/2005 | Leinenbach et al. | |
| 7,223,524 B2 | 5/2007 | Hiller et al. | |
| 7,290,487 B2 | 11/2007 | Hiller | |
| 2002/0018958 A1 | 2/2002 | Nishioka et al. | |
| 2008/0194762 A1 | 8/2008 | Sugasaki | |
| 2008/0258344 A1 | 10/2008 | Regan et al. | |
| 2009/0214983 A1 | 8/2009 | Figov et al. | |

FOREIGN PATENT DOCUMENTS

WO 2005/084959 9/2005

OTHER PUBLICATIONS

O. Melamed, U.S. Appl. No. 13/173,430, "Laser-Imageabe Flexographic Printing Precursors and Methods of Imaging", filed Jun. 30, 2011.
O. Melamed, U.S. Appl. No. 12/748,475 "Flexographic Printing Precursors and Methods of Making", filed Mar. 29, 2010.
B. Vigolo, et al., "Macroscopic Fibers and Ribbons of Oriented Carbon Nanotubes", www.sciencemag.org, Nov. 17, 2000, pp. 1331-1334.
U.S. Appl. No. 13/245,894, filed Sep. 27, 2011 titled "Method of Making Laser-Engraveable Flexographic Printing Precursors", by Ido Gal, et al.

*Primary Examiner* — Joshua D Zimmerman
(74) *Attorney, Agent, or Firm* — J. Lanny Tucker

(57) ABSTRACT

A laser-engraveable flexographic printing precursor or patternable element comprises a laser-engraveable layer having two orthogonal dimensions. This laser-engraveable layer comprises one or more elastomeric resins and non-metallic fibers that are oriented in the laser-engraveable layer predominantly in one of its two orthogonal dimensions. The non-metallic fibers have an average length of at least 0.1 mm and an average diameter of at least 1 μm. The oriented non-metallic fibers reduce curl and shrinkage in the precursor and improve print quality and press life.

24 Claims, No Drawings

LASER-ENGRAVEABLE FLEXOGRAPHIC PRINTING PRECURSORS AND METHODS OF IMAGING

RELATED APPLICATION

Reference is made here to commonly assigned U.S. Ser. No. 13/245,894, filed on Sep. 27, 2011, by Gal, Melamed, Kimelblat, and Amiel-Levy, (now issued as U.S. Pat. No. 8,563,087, Oct. 22, 2013), and entitled METHOD OF MAKING LASER-ENGRAVEABLE FLEXOGRAPHIC PRINTING PRECURSORS.

FIELD OF THE INVENTION

This invention relates to flexographic printing precursors that can be used to provide flexographic printing prints, sleeves, and cylinders. These flexographic printing precursors have a laser-engraveable layer (composition) that comprises oriented animal, plant, mineral, or polymeric fibers dispersed within one or more elastomeric resins. This invention also relates to a method of providing a relief image in a flexographic printing precursor.

BACKGROUND OF THE INVENTION

Flexography is a method of printing that is commonly used for high-volume printing runs. It is usually employed for printing on a variety of soft or easily deformed materials including but not limited to, paper, paperboard stock, corrugated board, polymeric films, fabrics, metal foils, and laminates. Coarse surfaces and stretchable polymeric films are economically printed using flexography.

Flexographic printing members are sometimes known as "relief" printing members (for example, relief-containing printing plates, printing sleeves, or printing cylinders) and are provided with raised relief images onto which ink is applied for application to a printable material. While the raised relief images are inked, the relief "floor" should remain free of ink. The flexographic printing precursors are generally supplied with one or more imageable layers that can be disposed over a backing layer or substrate. Flexographic printing also can be carried out using a flexographic printing cylinder or seamless sleeve having the desired relief image. These flexographic printing members can be provided from flexographic printing precursors that can be "imaged in-the-round" (ITR) using either a photomask or laser-ablatable mask (LAM) over a photosensitive composition (layer), or they can be imaged by direct laser engraving (DLE) of a laser-engraveable composition (layer) that is not necessarily photosensitive.

Flexographic printing precursors having laser-ablatable layers are described for example in U.S. Pat. No. 5,719,009 (Fan), which precursors include a laser-ablatable mask layer over one or more photosensitive layers. This publication teaches the use of a developer to remove unreacted material from the photosensitive layer, the barrier layer, and non-ablated portions of the mask layer.

There has been a desire in the industry for a way to prepare flexographic printing members without the use of photosensitive layers that are cured using UV or actinic radiation and that require liquid processing to remove non-imaged composition and mask layers. Direct laser engraving of precursors to produce relief printing plates and stamps is known but the need for relief image depths greater than 500 μm creates a considerable challenge when imaging speed is also an important commercial requirement. In contrast to laser ablation of mask layers that require low to moderate energy lasers and fluence, direct engraving of a relief-forming layer requires much higher energy and fluence. A laser-engraveable layer must also exhibit appropriate physical and chemical properties to achieve "clean" and rapid laser engraving (high sensitivity) so that the resulting printed images have excellent resolution and durability.

A number of elastomeric systems have been described for construction of laser-engravable flexographic printing precursors. For example, U.S. Pat. No. 6,223,655 (Shanbaum et al.) describes the use of a mixture of epoxidized natural rubber and natural rubber in a laser-engraveable composition. Engraving of a rubber is also described by S. E. Nielsen in Polymer Testing 3 (1983) pp. 303-310. U.S. Pat. No. 4,934,267 (Hashimito) describes the use of a natural or synthetic rubber, or mixtures of both, such as acrylonitrile-butadiene, styrene-butadiene and chloroprene rubbers, on a textile support. "Laser Engraving of Rubbers—The Influence of Fillers" by W. Kern et al., October 1997, pp. 710-715 (Rohstoffe Und Anwendendunghen) describes the use of natural rubber, nitrile rubber (NBR), ethylene-propylene-diene terpolymer (EPDM), and styrene-butadiene copolymer (SBR) for laser engraving.

EP 1,228,864A1 (Houstra) describes liquid photopolymer mixtures that are designed for UV imaging and curing, and the resulting printing plate precursors are laser-engraved using carbon dioxide lasers operating at about 10 μm wavelength. Such printing plate precursors are unsuitable for imaging using more desirable near-IR absorbing laser diode systems.

U.S. Pat. No. 5,798,202 (Cushner et al.) describes the use of reinforced block copolymers incorporating carbon black in a layer that is UV cured and remains thermoplastic. As pointed out in U.S. Pat. No. 6,935,236 (Hiller et al.), such curing can cause high absorption of UV as it traverses through the thick imageable layer. Although many polymers are suggested for this use in the literature, only extremely flexible elastomers have been used commercially because flexographic layers that are many millimeters thick must be designed for bending around a printing cylinder and securing with temporary bonding tape, and both must be removable after printing.

U.S. Pat. No. 6,776,095 (Telser et al.) describes elastomers including an EPDM rubber and U.S. Pat. No. 6,913,869 (Leinenbach et al.) describes the use of an EPDM rubber for the production of flexographic printing plates having a flexible metal support. U.S. Pat. No. 7,223,524 (Hiller et al.) describes the use of a natural rubber with highly conductive carbon blacks. U.S. Pat. No. 7,290,487 (Hiller et al.) lists suitable hydrophobic elastomers with inert plasticizers. U.S. Patent Application Publication 2002/0018958 (Nishioki et al.) describes a peelable layer and the use of rubbers such as EPDM and NBR together with inert plasticizers such as mineral oils.

An increased need for higher quality flexographic printing precursors for IR-laser engraving has highlighted the need to solve performance problems that were of less importance when quality demands were less stringent. It has been especially difficult to simultaneously improve the flexographic printing precursor in various properties because a change that can solve one problem can worsen or cause another problem.

For example, the rate of imaging is now an important consideration in laser engraving of flexographic printing precursors. Throughput (rate of imaging multiple precursors) by engraving depends upon printing plate precursor width because each precursor is imaged point by point. Imaging, multi-step processing, and drying of UV-sensitive precursors is time consuming but this process is independent of printing plate size, and for the production of multiple flexographic printing plates, it can be relatively fast because many flexographic printing plates can be passed through the multiple stages at the same time.

Copending and commonly assigned U.S. Ser. No. 12/748,475 (filed Mar. 29, 2010 by Melamed, Gal, and Dahan) describes flexographic printing precursors having laser-engraveable layers that include mixtures of high and low molecular weight EPDM rubbers, which mixtures provide improvements in performance and manufacturability. In addition, copending and commonly assigned U.S. Ser. No. 13/173,430 (filed Jun. 30, 2011 by Melamed, Gal, and Dahan) describes the use of CLCB EPDM elastomeric rubbers in laser-engraveable layers, which layers can also include various infrared radiation absorbers and non-IR absorptive particulate fillers.

A basic feature of a flexographic printing precursor structure is that while the laser-engraveable layer on the imaging side is elastomeric, it is useful to have a non-elastomeric layer on the backside (non-engraving side) in order to reduce stretching that creates distortion in the relief image during the printing process. Suitable backing materials are well known (see for example U.S. Pat. No. 4,272,608 of Proscow).

However, when the laser-engraveable layer contains an elastomeric rubber and is manufactured by casting the layer formulation onto a suitable substrate, calendaring, and vulcanizing, the elastomeric components in the laser-engraveable layer tend to shrink. The resulting flexographic printing precursor has a tendency to curl, for example along the length of a continuous roll with the laser-engraveable layer on the inside of the curl. This causes problems during the formation of precursor sheets and grinding to smooth the surface of the laser-engraveable layer. It also means that the flexographic printing precursor is manufactured with internal mechanical stress forces caused by the shrinkage and this can also result in printed image distortion and reduced print run length.

Thus, there is a need for flexographic printing precursors that can be prepared in an improved manner so that they exhibit reduced internal mechanical stresses and thus reduced tendency to curl and shrink.

SUMMARY OF THE INVENTION

The present invention provides a laser-engraveable flexographic printing precursor comprising a laser-engraveable layer having two orthogonal dimensions, the laser-engraveable layer comprising one or more elastomeric resins and non-metallic fibers that are oriented in the laser-engraveable layer predominantly in one of its two orthogonal dimensions, the non-metallic fibers having an average length of at least 0.1 mm and an average diameter of at least 1 µm.

In some embodiments, the laser-engraveable flexographic printing precursor of this invention comprises a substrate comprising a fabric on a polyester film, and the laser-engraveable layer is disposed over the substrate, wherein the laser-engraveable layer comprises:

one or more elastomeric resins in an amount of at least 40 weight % and up to and including 70 weight %, polypropylene fibers in an amount of at least 2 phr and up to and including 12 phr, a carbon black in an amount of at least 2 phr and up to and including 30 phr, a peroxide composition comprising one or more peroxides in an amount of at least 3 phr and up to and including 20 phr, and an inorganic, non-fibrous filler in an amount of at least 1 phr and up to and including 80 phr.

In addition, this invention provides a patternable element comprising a relief-forming laser-engraveable layer having two orthogonal dimensions, the laser-engraveable layer comprising one or more elastomeric resins and non-metallic fibers that are oriented in the laser-engraveable layer predominantly in one of its two orthogonal dimensions, the non-metallic fibers having an average length of at least 0.1 mm and an average diameter of at least 1 µm.

The details of these features are described below.

This invention also provides a method for providing a flexographic printing member with a relief image, comprising:

laser-engraving the laser-engraveable layer of the laser-engraveable flexographic printing precursor of all embodiments of this invention to provide a relief image in the laser-engraveable layer having a minimum relief depth of at least 50 µm to provide a flexographic printing member.

It has been found that the incorporation of oriented non-metallic fibers into the laser-engraveable layer of the flexographic printing precursors reduces curl, shrinkage, the problems resulting from curl, and shrinkage when the precursors are prepared as described herein. It has also been found that the flexographic printing precursor exhibits improved imaging properties such as print quality and print run length. In addition, there is an improvement in compression set and mechanical properties such as higher tensile strength and shorter elongation (the length at which the material breaks or snaps into at least two pieces) in the fiber-oriented dimension (see ASTM D3759).

Advantageously, the improved flexographic printing precursors of this invention can be either flexographic printing plate precursors or flexographic printing sleeve precursors. Thus, the present invention has wide applicability.

These advantages are also provided with patternable elements of this invention that are described below that can be used in technologies other than flexography but where laser engraving is possible for putting a pattern in the laser-engraveable layer.

DETAILED DESCRIPTION OF THE INVENTION

As used herein to define various components of the laser-engraveable compositions, formulations, and layers, unless otherwise indicated, the singular forms "a", "an", and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term's definition should be taken from a standard dictionary.

The term "imaging" refers to laser-engraving of the background areas while leaving intact the non-laser engraved areas of the flexographic printing precursor that will be inked up and printed using a flexographic ink.

The terms "flexographic printing precursor" and "laser-engraveable flexographic printing precursor" refer to a non-imaged flexographic element of this invention. The flexographic printing precursors include flexographic printing plate precursors, flexographic printing sleeve precursors, and flexographic printing cylinder precursors, all of which can be laser-engraved to provide a relief image using a laser according to the present invention to have a dry relief depth of at least 50 µm and up to and including 4000 µm. Such laser-engraveable, relief-forming precursors can also be known as "flexographic printing plate blanks", "flexographic printing cylinders", or "flexographic sleeve blanks". The laser-engraveable flexographic printing precursors can also have seamless or continuous forms.

The term "flexographic printing member" is used to define the resulting product of laser-engraving to provide a relief image in a flexographic printing precursor of this invention. Such flexographic printing members can be flexographic printing plates, flexographic printing cylinders, and flexographic printing sleeves.

By "laser-engraveable", we mean that the laser-engraveable (or imageable) layer can be imaged using a suitable laser-engraving source including infrared radiation, near-infrared radiation lasers, for example carbon dioxide lasers, Nd:YAG lasers, laser diodes, and fiber lasers that produces heat within the laser-engraveable layer that causes rapid local changes in the laser-engraveable layer so that the imaged regions are physically detached from the rest of the layer or substrate and ejected from the layer and collected using suitable means. Non-imaged regions of the laser-engraveable layer are not removed or volatilized to an appreciable extent and thus form the upper surface of the relief image that is the flexographic printing surface. The breakdown is a violent process that includes eruptions, explosions, tearing, decomposition, fragmentation, oxidation, or other destructive processes that create a broad collection of solid debris and gases. This is distinguishable from, for example, image transfer. "Laser-ablative" and "laser-engraveable" can be used interchangeably in the art, but for purposes of this invention, the term "laser-engraveable" is used to define the imaging according to the present invention in which a relief image is formed in the laser-engraveable layer. It is distinguishable from image transfer methods in which ablation is used to materially transfer pigments, colorants, or other image-forming components.

Unless otherwise indicated, the term "weight %" refers to the amount of a component or material based on the total dry layer weight of the composition or layer in which it is located.

Unless otherwise indicated, the terms "laser-engraveable composition" and "laser-engravable layer formulation" are intended to be the same.

The term "phr" denotes the relationship between a compound or component in the laser-engraveable layer and the total elastomeric rubber dry weight in that layer and refers to "parts per hundred rubber parts".

The "top surface" is equivalent to the "relief-image forming surface" and is defined as the outermost surface of the laser-engraveable layer and is the first surface of that layer that is struck by imaging (ablating) radiation during the engraving or imaging process.

The "bottom surface" is defined as the surface of the laser-engraveable that is most distant from the imaging radiation.

The term "elastomeric rubber" refers to rubbery materials that generally regain their original shape when stretched or compressed.

The term "oriented" means that at least 50% of the fibers in the laser-engraveable layer are arranged in essentially the same planar dimension of the two orthogonal dimensions, and these fibers are arranged within 20 degrees of the same dimension of the two orthogonal dimensions. This is also what is meant by the term "predominantly".

The term "two orthogonal dimensions" generally refer to length and width for a flat flexographic printing precursor such as a sheet, roll, or web. In reference to flexographic printing sleeve precursors and flexographic printing sleeve precursors, one dimension is in the widthwise dimension across the sleeve precursor or cylinder precursor. The other dimension that is considered orthogonal to the widthwise dimension is the curved surface of the sleeve precursor or cylinder precursor.

The term "non-IR absorptive" means that the material absorbs insufficient infrared radiation so as to contribute to laser engraving to an appreciable extent. Such materials are not intended to provide laser engraving capacity but they can do so to a minor extent compared to the infrared radiation absorbers that can also be present.

Flexographic Printing Precursors

The flexographic printing precursors of this invention are laser-engraveable to provide a desired relief image, and comprise at least one laser-engraveable layer that is formed from a laser-engraveable composition that comprises one or more elastomeric resins in a total amount generally of at least 30 weight % and up to and including 80 weight %, and more typically at least 40 weight % and up to and including 70 weight %, based on the total solids of the laser-engraveable composition or laser-engraveable layer.

Useful elastomeric resins that can be used in the laser-engraveable composition include any of those known in the art for this purpose, including but not limited to, thermosetting or thermoplastic urethane resins that are derived from the reaction of a polyol (such as polymeric diol or triol) with a polyisocyanate or the reaction of a polyamine with a polyisocyanate, copolymers of styrene and butadiene, copolymers of isoprene and styrene, styrene-butadiene-styrene block copolymers, styrene-isoprene-styrene copolymers, other polybutadiene or polyisoprene elastomers, nitrile elastomers, polychloroprene, polyisobutylene and other butyl elastomers, any elastomers containing chlorosulfonated polyethylene, polysulfide, polyalkylene oxides, or polyphosphazenes, elastomeric polymers of (meth)acrylates, elastomeric polyesters, and other similar polymers known in the art.

Other useful elastomeric resins include vulcanized rubbers, such as Nitrile (Buna-N), Natural rubber, Neoprene or chloroprene rubber, silicone rubbers, fluorocarbon rubbers, fluorosilicone rubbers, SBR (styrene-butadiene rubber), NBR (acrylonitrile-butadiene rubber), ethylene-propylene rubber, and butyl rubber. Still other useful elastomeric resins include but are not limited to, poly(cyanoacrylate)s that include recurring units derived from at least one alkyl-2-cyanoacrylate monomer and that forms such monomer as the predominant low molecular weight product during laser-engraving. These polymers can be homopolymers of a single cyanoacrylate monomer or copolymers derived from one or more different cyanoacrylate monomers, and optionally other ethylenically unsaturated polymerizable monomers such as (meth)acrylate, (meth)acrylamides, vinyl ethers, butadienes, (meth)acrylic acid, vinyl pyridine, vinyl phosphonic acid, vinyl sulfonic acid, and styrene and styrene derivatives (such as α-methylstyrene), as long as the non-cyanoacrylate co-monomers do not inhibit the ablation process. The monomers used to provide these polymers can be alkyl cyanoacrylates, alkoxy cyanoacrylates, and alkoxyalkyl cyanoacrylates. Representative examples of poly(cyanoacrylates) include but are not limited to poly(alkyl cyanoacrylates) and poly(alkoxyalkyl cyanoacrylates) such as poly(methyl-2-cyanoacrylate), poly(ethyl-2-cyanoacrylate), poly(methoxyethyl-2-cyanoacrylate), poly(ethoxyethyl-2-cyanoacylate), poly(methyl-2-cyanoacrylate-co-ethyl-2-cyanoacrylate), and other polymers described in U.S. Pat. No. 5,998,088 (Robello et al.).

Yet other useful elastomeric resins are alkyl-substituted polycarbonate or polycarbonate block copolymers that form a cyclic alkylene carbonate as the predominant low molecular weight product during depolymerization from ablation. The polycarbonates can be amorphous or crystalline as described for example in Cols. 9-12 of U.S. Pat. No. 5,156,938 (Foley et al.).

In many embodiments, the laser-engraveable composition or layer comprises one or more elastomeric resins at least one of which is an EPDM elastomeric rubber. Mixtures of EPDM elastomeric rubbers can be used. For example, one or more "high molecular weight" EPDM elastomeric rubbers can be included in the laser-engraveable composition or layer, and these compounds can be obtained from a number of commercial sources as the following products: Keltan® EPDM (from DSM Elastomers), Royalene® EPDM (from Lion Copolymers), Kep® (from Kumho Polychem), Nordel (from DuPont Dow Elastomers). Such high molecular weight EPDM elastomeric rubbers generally have a number average molecular weight of at least 20,000 and up to and including 800,000 and typically of at least 200,000 and up to and including 800,000, and more typically of at least 250,000 and up to and including 500,000.

In addition to, or in place of, the high molecular weight EPDM elastomeric rubber, the laser-engraveable composition or layer can further comprise one or more "low molecular weight" EPDM elastomeric rubbers that are generally in liquid form and have a number average molecular weight of at least 2,000 and up to but less than 20,000, and typically of at least 2,000 and up to and including 10,000, and more typically of at least 2,000 and up to and including 8,000. Such low molecular weight EPDM elastomeric rubbers can also be obtained from various commercial sources, for example as Trilene® EPDM (from Lion Copolymers).

In some embodiments, the laser-engraveable composition or layer comprises: (a) at least one high molecular weight EPDM elastomeric rubber that has a molecular weight of at least 20,000, (b) at least one low molecular weight EPDM elastomeric rubber that has a molecular weight of at least 2,000 and less than 20,000, or (c) a mixture of one or more high molecular weight EPDM elastomeric rubbers each having a molecular weight of at least 20,000 and one or more of the low molecular weight EPDM elastomeric rubbers having a molecular weight of at least 2,000 and less than 20,000, at a weight ratio of high molecule weight EPDM elastomeric rubber to the low molecular weight EPDM elastomeric rubber of from 1:2.5 to 16:1, or typically from 1:1 to 4:1.

In some embodiments, the laser-engraveable layer (or composition) includes one or more CLCB EPDM elastomeric rubbers as described for example in copending and commonly assigned U.S. Ser. No. 13/173,430 (noted above) that is incorporated herein by reference. Some of these elastomeric rubbers are commercially available from DSM Elastomers under the product names of Keltan® 8340A, 2340A, and 7341A. Some details of such EPDM elastomeric rubbers are also provided in a paper presented by Odenhamn to the RubberTech China Conference 1998. In general, the CLCB EPDM elastomeric rubbers are prepared from controlled side reactions during the polymerization of the ethylene, propylene, and diene terpolymers in the presence of third generation Zeigler Natta catalysts.

Still other useful elastomeric resins are nanocrystalline polypropylenes as described in more detail in copending and commonly assigned U.S. Ser. No. 13/053,700 (filed Mar. 22, 2011 by Landry-Coltrain and Franklin) that is incorporated herein by reference.

It is possible to introduce a mineral oil into the laser-engraveable composition or layer. One or more mineral oils can be present in an amount of at least 5 phr and up to and including 50 phr, but the mineral oil can be omitted if one or more low molecular weight EPDM elastomeric rubbers are present in an amount of at least 5 phr and up to and including 40 phr.

In most embodiments, the laser-engraveable composition (layer) comprises one or more UV, visible light, near-IR, or IR radiation absorbers that facilitate or enhance laser engraving to form a relief image. While any radiation absorber that absorbs a given wavelength of engraving energy can be used, in most embodiments, the radiation absorbers have maximum absorption at a wavelength of at least 700 nm and at greater wavelengths in what is known as the infrared portion of the electromagnetic spectrum. In particularly useful embodiments, the radiation absorber is a near-infrared radiation absorber having a $\lambda_{max}$ in the near-infrared portion of the electromagnetic spectrum, that is, having a $\lambda_{max}$ of at least 700 nm and up to and including 1400 nm or at least 750 nm and up to and including 1250 nm, or more typically of at least 800 nm and up to and including 1250 nm. If multiple engraving means having different engraving wavelengths are used, multiple radiation absorbers can be used, including a plurality of near-infrared radiation absorbers.

Particularly useful near-infrared radiation absorbers are responsive to exposure from near-IR lasers. Mixtures of the same or different types of near-infrared radiation absorbers can be used if desired. A wide range of useful near-infrared radiation absorbers include but are not limited to, carbon blacks and other near-IR radiation absorbing organic or inorganic pigments (including squarylium, cyanine, merocyanine, indolizine, pyrylium, metal phthalocyanines, and metal dithiolene pigments), and metal oxides.

Examples of useful carbon blacks include RAVEN® 450, RAVEN® 760 ULTRA®, RAVEN® 890, RAVEN® 1020, RAVEN® 1250 and others that are available from Columbian Chemicals Co. (Atlanta, Ga.) as well as N 293, N 330, N 375, and N 772 that are available from Evonik Industries AG (Switzerland) and Mogul® L, Mogul® E, Emperor 2000, and Regal® 330, and 400, that are available from Cabot Corporation (Boston Mass.). Both non-conductive and conductive carbon blacks (described below) are useful. Some conductive carbon blacks have a high surface area and a dibutyl phthalate (DBP) absorption value of at least 150 ml/100 g, as described for example in U.S. Pat. No. 7,223,524 (Hiller et al.) and measured using ASTM D2414-82 DBP Absorption of Carbon Blacks. Carbon blacks can be acidic or basic in nature. Useful conductive carbon blacks also can be obtained commercially as Ensaco™ 150 P (from Timcal Graphite and Carbon), Hi Black 160 B (from Korean Carbon Black Co. Ltd.), and also include those described in U.S. Pat. No. 7,223,524 (noted above, Col. 4, lines 60-62) that is incorporated herein by reference. Useful carbon blacks also include those that are surface-functionalized with solubilizing groups, and carbon blacks that are grafted to hydrophilic, nonionic polymers, such as FX-GE-003 (manufactured by Nippon Shokubai).

Other useful near-infrared radiation absorbing pigments include, but are not limited to, Heliogen Green, Nigrosine Base, iron (III) oxides, transparent iron oxides, magnetic pigments, manganese oxide, Prussian Blue, and Paris Blue. Other useful near-infrared radiation absorbers include carbon nanotubes, such as single- and multi-walled carbon nanotubes, graphite (including porous graphite), graphene, graphite oxide, and carbon fibers.

A fine dispersion of very small particles of pigmented near-IR radiation absorbers can provide an optimum laser-engraving resolution and ablation efficiency. Suitable pigment particles are those with diameters less than 1 μm.

Dispersants and surface functional ligands can be used to improve the quality of the carbon black, metal oxide, or pigment dispersion so that the near-IR radiation absorber is uniformly incorporated throughout the laser-engraveable layer.

In general, one or more radiation absorbers, such as near-infrared radiation absorbers, are present in the laser-engraveable composition in a total amount of at least total amount of at least 2 phr and up to and including 90 phr and typically from at least 2 phr and up to and including 30 phr. Alternatively, the near-infrared radiation absorber includes one or more non-conductive carbon blacks, carbon nanotubes, graphene, graphite, graphite oxide, or a conductive carbon black having a dibutyl phthalate (DBP) absorption value greater than 110 ml/100 g, in an amount of at least 3 phr, or at least 5 phr and up to and including 30 phr.

It is also possible that the near-infrared radiation absorber (such as a carbon black) is not dispersed uniformly within the laser-engraveable layer, but it is present in a concentration that is greater near the bottom surface of the laser-engraveable layer than the top surface. This concentration profile can provide a laser energy absorption profile as the depth into the laser-engraveable layer increases. In some instances, the concentration changes continuously and generally uniformly with depth. In other instances, the concentration is varied with layer depth in a step-wise manner. Further details of such arrangements of the near-IR radiation absorbing compound are provided in U.S. Patent Application Publication 2011/0089609 (Landry-Coltrain et al.) that is incorporated herein by reference.

Useful inorganic non-fibrous fillers can also be present in the laser-engraveable composition (layer) and such useful materials include but are not limited to, various silicas (treated, fumed, or untreated), calcium carbonate, magnesium oxide, talc, barium sulfate, kaolin, bentonite, zinc oxide, mica, titanium dioxide, and mixtures thereof. Particularly useful inorganic non-fibrous fillers are silica, calcium carbonate, and alumina, such as fine particulate silica, fumed silica, porous silica, surface treated silica, sold as Aerosir® from Degussa, Ultrasil® from Evonik, and Cab-O-Sil® from Cabot Corporation, micropowders such as amorphous magnesium silicate cosmetic microspheres sold by Cabot and 3M Corporation, calcium carbonate and barium sulfate particles and microparticles, zinc oxide, and titanium dioxide, or mixtures of two or more of these materials. These inorganic non-fibrous fillers are generally non-IR absorptive materials.

The amount of the inorganic non-fibrous fillers in the laser-engraveable composition is generally at least 1 phr and up to and including 80 phr, or typically at least 1 phr and up to and including 60 phr. Coupling agents can be added for connection between filler particles and polymers in the laser-engraveable layer. An example of a coupling agent is a silane (Dynsylan® 6498 or Si 69 available from Evonik Degussa Corporation).

The infrared radiation absorber(s), such as carbon blacks, can be present in the infrared radiation ablatable layer generally in a total amount between 1 phr and up to and including 60 phr, and typically from about 2 to about 30 phr.

It is essential that the laser-engraveable composition (and layer) used in this invention comprises one or more types non-metallic fibers that can be obtained from various non-metallic sources. These non-metallic fibers can be naturally occurring or prepared by transformation of naturally-occurring materials. For example, the non-metallic fibers can be derived from animal, plant, or mineral sources, or they can be provided as carbon or naturally-occurring or synthetic polymeric fibers. The non-metallic fibers are aligned or oriented predominantly in one of the two orthogonal dimensions of the laser-engraveable layer (precursor). These orthogonal dimensions can be the same size or in most embodiments, one dimension is greater than the other and the non-metallic fibers are oriented predominantly in the longer of the two orthogonal dimensions.

For example, when the flexographic printing precursor is prepared in the form of a continuous web or roll that can be cut into individual flexographic printing plate precursors, the continuous lengthwise dimension is generally greater than the crosswise (widthwise) dimension. In such embodiments, the non-metallic fibers described herein are oriented predominantly in the lengthwise dimension along the continuous roll.

Useful non-metallic fibers can be obtained from various plant sources such as cotton, hemp, flax, burlap, sisal, cellulosic plants (trees, shrubs, and reeds). Other non-metallic fibers are obtained from animal sources, including fur, wool, cashmere, angora, alpaca, or silk fibers. Non-metallic fibers can also be obtained from various minerals and include but are not limited to, wollestonite, atlapugite, halloysite, glass, fiberglass, silica, and basalt fibers.

Carbon fibers such as fibers composed of multiple carbon nanotubes are also useful. Such carbon fibers are described for example by Vigolo et al. in *Science*, Vol. 290, Nov. 17, 2000, pp. 1331-1334.

In addition synthetic polymeric fibers such as fibers composed of a polyolefin (such as polyolefin and polypropylene), poly(vinyl chloride), polyamide, polyester, phenol-formaldehyde, polyvinyl alcohol, acrylic polyester, aromatic polyamide (for example, nylon), acrylic resin, or polyurethane, or elastomeric fibers such as spandex, as useful.

Particularly useful embodiments of the laser-engraveable layer comprise polypropylene fibers, polyamide fibers, polyester fibers, phenol-formaldehyde fibers, polyurethane fibers, polyvinyl alcohol fibers, poly(vinyl chloride) fibers, carbon fibers, glass fibers, or basalt fibers that are oriented in the laser-engraveable layer predominantly in one of its two orthogonal dimensions such as the lengthwise dimension of a continuous web or roll.

Non-metallic fibers that melt or decompose under the process of laser-engraving have been found to be particularly advantageous. For example, such useful oriented non-metallic fibers are polypropylene fibers.

Useful non-metallic fibers are generally non-tubular and do not generally have tubular cavities that continue along most or all of the length of the fibers. The fibers can, however, have some pores.

It is desired that at least 60%, and typically at least 80%, of the non-metallic fibers are oriented predominantly in one of the two orthogonal dimensions, for example the longer of the two orthogonal dimensions, of the laser-engraveable layer.

The average size length and diameter of the oriented non-metallic fibers can vary according to the type and composition of fibers used and the thickness and composition of the laser-engraveable composition into which they are incorporated. Generally, it has been found that useful average non-metallic fiber length is at least 0.1 mm and up to and including 15 mm, or typically at least 0.2 mm and up to and including 10 mm. In addition, the average non-metallic fiber diameter is at least 1 $\mu$m and up to and including 100 $\mu$m, or typically at least 10 $\mu$m and up to and including 50 $\mu$m.

The non-metallic fibers are generally introduced into the laser-engraveable composition (layer) as described below in an amount of at least 1 phr and up to and including 30 phr, or typically at least 1 and up to and including 25 phr, or more likely at least 2 phr and up to and including 12 phr. In some embodiments of the present invention, the flexographic printing precursors can comprise a laser-engraveable layer that comprises at least 1 phr and up to and including 60 phr, or typically at least 3 phr and up to and including 40 phr of a non-conductive carbon black having a dibutyl phthalate (DBP) adsorption of less than 110, non-metallic fibers (such as poly(propylene) fibers) in an amount of at least 1 phr and up to and including 25 phr, one or more EPDM elastomeric rubbers, and other components described herein. If both a non-conductive carbon black and an inorganic filler are present, the weight ratio of the carbon black to the inorganic filler(s) is from 1:40 to 30:1. Such laser-engraveable layer can be prepared as described below using a vulcanizing composition in an amount as described below.

Similarly, when a conductive carbon black is used, the amount of conductive carbon black in the laser-engraveable layer can be at least 3 and up to and including 30 phr, and the weight ratio of the conductive carbon black to an inorganic filler is from 1:25 to 30:1.

It is also desirable that the laser-engraveable composition used to prepare the laser-engraveable layers comprise a vulcanizing composition that comprises: (1) a sulfur composition, (2) a peroxide composition, or (3) a composition comprising a mixture of a sulfur composition and a peroxide composition. In such compositions, the weight ratio of a near-infrared radiation absorber (such as a carbon black) to the vulcanizing composition can be from 1:10 to 10:1.

The vulcanizing composition (or crosslinking composition) can crosslink the elastomeric resins and any other resin in the laser-engraveable composition that can benefit from crosslinking. The vulcanizing composition, including all of its essential components, is generally present in the laser-engraveable composition in an amount of at least 3 phr and up to and including 20 phr, or typically of at least 7 phr and up to and including 12 phr, especially when the vulcanizing composition comprises the mixture of first and second peroxides described herein.

Useful sulfur vulcanizing compositions comprise one or more sulfur and sulfur-containing compounds such as Premix sulfur (insoluble 65%), zinc dibutyl dithiocarbamate (ZDBC), 2-benzothiazolethiol (MBT), and tetraethylthiuram disulfide (TETD). Generally, the sulfur vulcanizing compositions can also comprise one or more accelerators as additional essential components, including but not limited to tetramethylthiuram disulfide (TMTD), tetramethylthiuram monosulfide (TMTM), and 4,4'-dithiodimorpholine (DTDM) in a molar ratio of the sulfur or sulfur-containing compound to the accelerator of from 1:12 to 2.5:1. Thus, most useful sulfur vulcanizing compositions consist essentially of: (1) one or more of sulfur or a sulfur-containing compound, and (2) one or more accelerators. Other useful sulfur-containing compounds, accelerators (both primary and secondary compounds), and useful amounts of each are well known in the art.

Other useful vulcanizing compositions are peroxide vulcanizing compositions that comprise one or more peroxides including but not limited to, di(t-butylperoxyisopropyl)benzene, 2,5-dimethyl-2,5 bis(t-butyl peroxy)hexane, dicumyl peroxide, di(t-butyl) peroxide, butyl 4,4% di(t-butylperoxy) valerate, 1,1'-bis(t-butylperoxy)-3,3,5-trimethylcyclohexane, t-butyl cumyl peroxide, t-butyl peroxybenzoate, t-butyl peroxy-2-ethylhexyl carbonate, and any others that can react with single carbon-carbon bonds and thus produce a higher curing density. The term "peroxide" also includes "hydroperoxides". Many commercially available peroxides are supplied at 40-50% activity with the remainder of the commercial composition being inert silica or calcium carbonate particles. It is also useful to include one or more co-reagents in the peroxide vulcanizing compositions at a molar ratio to the total peroxides of from 1:6 to 25:1. Useful co-reagents include but are not limited to, triallyl cyanurate (TAC), triallyl isocyanurate, triallyl trimellitate, the esters of acrylic and methacrylic acids with polyvalent alcohols, and N,N'-m-phenylenedimaleimide (HVA-2, DuPont) to enhance the liberation of free radicals from the peroxides. Thus, useful peroxide compositions consist essentially of (1) one or more peroxides, and particularly mixtures of first and second peroxides described below, and (2) one or more co-reagents. Other useful peroxides and co-reagents (such as Type I and Type II compounds) are well known in the art.

It is particularly useful to use a mixture of at least first and second peroxides in a peroxide vulcanizing composition, wherein the first peroxide has a $t_{90}$ value of at least 1 minute and up to and including 6 minutes, typically at least 2 minutes and up to and including 6 minutes, as measured at 160° C., and the second peroxide has a $t_{90}$ value of at least 8 minutes and up to and including 20 minutes, or typically at least 10 minutes and up to and including 20 minutes, as measured at 160° C. Useful examples of the first peroxides include but are not limited to, t-butyl peroxybenzoate, 1,1'-bis(t-butylperoxy)-3,3,5-trimethylcyclohexane, t-butylperoxy 2-ethylhexyl carbonate, and butyl 4,4'-di(t-butylperoxy)valerate. Useful examples of the second peroxides include but are not limited to, di(t-butylperoxyisopropyl)benzene, dicumyl peroxide, t-butyl cumyl peroxide, and 2,5-dimethyl-2,5 bis(t-butyl peroxy)hexane. Other representative first and second peroxides could be easily determined by consulting known information about the $t_{90}$ values for various peroxides.

The molar ratio of the first peroxide to the second peroxide is generally at least 1:4 and up to and including 5:1, or typically at least 1:1.5 and up to and including 3:1.

These mixtures of first and second peroxides can also comprise one or more co-reagents as described above. Thus, these particularly useful peroxide vulcanizing compositions can consist essentially of: (1) one or more first peroxides, (2) one or more second peroxides, and (3) one or more co-reagents.

The mixtures comprising at least one first peroxide and at least one second peroxide can further comprise additional peroxides as long as the laser-engraveable composition has the desired characteristics described herein. For example, it is particularly useful that the laser-engraveable composition exhibit a $t_{90}$ value of at least 1 minute and up to and including 17 minutes at 160° C.

Still other useful vulcanizing compositions comprise at least one of sulfur or a sulfur-containing compound (with or without an accelerator), and at least one peroxide (with or without a co-reagent). Thus, some of these vulcanizing compositions comprise: (1) sulfur or a sulfur-containing compound, (2) a first peroxide, and (3) a second peroxide, all as described above. Still other useful vulcanizing compositions consist essentially of: (1) sulfur or a sulfur-containing compound, (2) one or more accelerators, (3) one or more peroxides (such as a mixture of a first and second peroxides), and (4) one or more co-reagents, all as described above.

In some embodiments of this invention, the laser-engraveable composition comprises a near-infrared radiation absorber that is a carbon black (conductive or non-conductive). When a peroxide vulcanizing composition is used comprising first and second peroxides (as described above with the noted ranges of $t_{90}$ values at 160° C.), the near-infrared radiation absorber can also be a conductive or non-conductive carbon black wherein the weight ratio of the carbon black to the mixture of at least first and second peroxides is from 1:17 to 10:1. These weight ratios do not include the co-reagents that are also likely to be present in the peroxide vulcanizing composition.

The laser-engraveable composition or layer can further comprise microcapsules that are dispersed generally uniformly within the laser-engraveable composition. These "microcapsules" can also be known as "hollow beads", "hollow spheres", "microspheres", microbubbles", "micro-balloons", "porous beads", or "porous particles". Some microcapsules include a thermoplastic polymeric outer shell and a core of either air or a volatile liquid such as isopentane or isobutane. The microcapsules can comprise a single center core or many voids (pores) within the core. The voids can be interconnected or non-connected. For example, non-laser-ablatable microcapsules can be designed like those described in U.S. Pat. No. 4,060,032 (Evans) and U.S. Pat. No. 6,989,220 (Kanga) in which the shell is composed of a poly[vinylidene-(meth)acrylonitrile] resin or poly(vinylidene chloride), or as plastic micro-balloons as described for example in U.S. Pat. No. 6,090,529 (Gelbart) and U.S. Pat. No. 6,159,659 (Gelbart). The amount of microspheres present in the laser-engraveable composition or layer can be at least 1 phr and up to and including 15 phr. Some useful microcapsules are the EXPANCEL® microspheres that are commercially available from Akzo Noble Industries (Duluth, Ga.), Dualite and Micropearl polymeric microspheres that are available from Pierce & Stevens Corporation (Buffalo, N.Y.), hollow plastic pigments that are available from Dow Chemical Company (Midland, Mich.) and Rohm and Haas (Philadelphia, Pa.). The useful microcapsules generally have a diameter of 50 µM or less.

Upon laser-engraving, the microspheres that are hollow or filled with an inert solvent, burst and give a foam-like structure or facilitate ablation of material from the laser-engraveable layer because they reduce the energy needed for ablation.

Optional addenda in the laser-engraveable composition or layer can include but are not limited to, dyes, antioxidants, antiozonants, stabilizers, dispersing aids, surfactants, and adhesion promoters, as long as they do not interfere with laser-engraving efficiency.

When the near-infrared radiation absorber, such as a carbon black, is used with the non-IR inorganic absorptive filler as described above, the weight ratio of the near-infrared radiation absorber to the non-IR absorptive inorganic filler is from 1:40 to 30:1 or typically from 1:30 to 20:1, or more typically from 1:20 to 10:1. When these weight ratios are used, the result is a laser-engraveable layer hardness that provides excellent printing quality, low compression set that provides a resistance to changes in the flexographic printing member after impact during each printing impression, and improved imaging speed.

The laser-engraveable layer incorporated into the flexographic printing precursors of this invention has a dry thickness of at least 50 µm and up to and including 4,000 µm, or typically of at least 200 µm and up to and including 2,000 µm.

The flexographic printing precursors can comprise one or more layers. Thus, the precursors can comprise multiple layers, at least one of which is the laser-engraveable layer in which the relief image is formed. There can be a non-laser-engraveable elastomeric resin layer (for example, a cushioning layer) between a substrate and the laser-engraveable layer.

While a single laser-engraveable layer is present in most flexographic printing precursors, there can be multiple laser-engraveable layers formed from the same or different laser-engraveable compositions having the same or different elastomeric resins and amounts.

In most embodiments, the laser-engraveable layer is the outermost layer of the flexographic printing precursors, including embodiments where the laser-engraveable layer is disposed on a printing cylinder as a flexographic printing sleeve precursor. However, in some embodiments, the laser-engraveable layer can be located underneath an outermost capping smoothing layer that provides additional smoothness or better ink reception and release. This smoothing layer can have a general thickness of at least 1 µn and up to and including 200 µm.

The flexographic printing precursors can comprise a self-supporting laser-engraveable layer (defined above) that does not need a separate substrate to provide physical integrity and strength. In such embodiments, the laser-engraveable layer is thick enough and laser engraving is controlled in such a manner that the relief image depth is less than the entire thickness, for example at least 20% and up to and including 80% of the entire dry laser-engraveable layer thickness.

However, in other embodiments, the flexographic printing precursor has a suitable dimensionally stable, non-laser-engraveable substrate having an imaging side and a non-imaging side. The substrate has at least one laser-engraveable layer disposed on the imaging side. Suitable substrates include dimensionally stable polymeric films, aluminum sheets or cylinders, transparent foams, ceramics, fabrics, or laminates of polymeric films (from condensation or addition polymers) and metal sheets such as a laminate of a polyester and aluminum sheet or polyester/polyamide laminates, or a laminate of a polyester film and a compliant or adhesive support. Polyester, polycarbonate, polyvinyl, and polystyrene films are typically used. Useful polyesters include but are not limited to poly(ethylene terephthalate) and poly(ethylene naphthalate). The substrates can have any suitable thickness, but generally they are at least 0.01 mm or at least 0.05 mm and up to and including 0.5 mm thick. An adhesive layer can be used to secure the laser-engraveable layer to the substrate.

Some particularly useful substrates comprise one or more layers of a metal, fabric, or polymeric film, or a combination thereof. For example, a fabric web can be disposed over a polyester film or aluminum sheet using a suitable adhesive, and the laser-engraveable layer is disposed over this substrate. Such a fabric web can have a thickness of at least 0.1 mm and up to and including 0.5 mm, and the polyester support thickness can be at least 100 µm and up to and including 200 µm, or the aluminum support can have a thickness of at least 200 µm and up to and including 400 µm. The dry adhesive thickness can be at least 10 µm and up to and including 80 µm.

There can be a non-laser-engraveable backcoat on the non-imaging side of the substrate that can comprise a soft rubber or foam, or other compliant layer. This non-laser-engraveable backcoat can provide adhesion between the substrate and printing press rollers and can provide extra compliance to the resulting flexographic printing member.

Although advantages such as a resistance to curl and shrinkage in the flexographic printing precursors are more evident in flexographic printing plate precursors, nevertheless the present invention also provides improved flexographic printing sleeve precursors. All of these precursors can be cleanly engraved using infrared radiation (lasers) to provide very sharp features in the resulting printed images. In addition, these precursors have improved run length and can be used for many high quality prints without degradation.

In a more general aspect, the present invention also includes patternable elements comprising a relief-forming laser-engraveable layer having two orthogonal dimensions, the laser-engraveable layer comprising one or more elastomeric resins and non-metallic fibers that are oriented in the laser-engraveable layer predominantly in one of its two orthogonal dimensions, the non-metallic fibers having an average length of at least 0.1 mm and an average diameter of at least 1 µm. The layers and components of these patternable elements are defined as described above for the flexographic printing precursors, and the advantages described above for the flexographic printing precursors can also be obtained in these patternable elements.

This invention also includes a method for providing a pattern, comprising:

laser-engraving the laser-engraveable layer of any of the patternable elements of this invention to provide a pattern in the laser-engraveable layer having a minimum relief image depth of at least 50 µm to provide a patterned element that can have various uses beyond flexography.

Preparation of Flexographic Printing Precursors

The flexographic printing precursors can be prepared using a unique set of operations in which the non-metallic fibers described herein are introduced into a laser-engraveable composition in such a manner that the fibers become oriented in a desired fashion predominantly in one of the two orthogonal dimensions of the resulting laser-engravable layer.

An un-vulcanized mixture of one or more elastomeric resins (described above, for example including an EPDM elastomeric rubber) and the non-metallic fibers described above is provided in a suitable manner, for example, suitable mixing operations to obtain good overall mixing. A non-vulcanizing composition (containing no vulcanizing peroxides and sulfur compounds) and optional other components (also described above, such as near-infrared radiation absorber and inorganic fillers) are added to (mixed into) the resulting elastomeric mixture. This operation can be achieved using a Banbury mill.

The resulting elastomeric mixture is then treated mechanically to orient the non-metallic fibers predominantly in the same direction that will then be observed to be oriented in one of the two orthogonal dimensions of the resulting laser-engraveable layer. For example, this mechanical treatment can be achieved using a two-mill roller under conditions known in the art. Alternatively, the resulting elastomeric mixture can be extruded using known extrusion apparatus, or subjected to a Banbury mill and then calendered using known equipment and conditions.

At suitable times, the resulting elastomeric mixture can be examined until it is verified that fiber orientation has taken place. For example this can be done by sectioning the resulting elastomeric mixture along the direction of milling and vertical to it. Microscopic inspection can be used to evaluate the amount of fiber orientation.

The elastomeric mixture, for example comprising an EPDM elastomeric rubber and other components as described above is formulated or mixed together. Useful additional components include inorganic fillers and near-infrared radiation absorbers such as a carbon black. The resulting elastomeric mixture is then compounded using standard equipment for rubber processing (as noted above, a 2-roll mill or internal mixer of the Banbury type followed by calendering) to orient the non-metallic fibers. During this mechanical treatment, the temperature of the elastomeric mixture can rise to 110° C. or more due to the high shear forces in the mixing apparatus. This mechanical treatment can take from 5 to 30 minutes depending upon the size of the mixture, the amount of inorganic fillers, the type of elastomeric resin (s), and other factors known to a skilled artisan. The non-metallic fibers can be added at any time during this mechanical treatment with further mixing. As the elastomeric mixture exits the appropriate apparatus, typically as a sheet, it can be checked for fiber orientation by examining sections taken in the direction of flow as well as vertical to the direction of flow to examine whether the fibers are orientated. Further passes through the mechanical treatment apparatus can be made, ensuring that the optimal numbers of fibers are desirably oriented in the desired dimension.

The mechanically treated elastomeric mixture can be then treated to vulcanizing conditions (see below), or in un-vulcanized state, it can be deposited onto a carrier base (such as a fabric web) and wound into a continuous roll of infrared radiation ablatable layer on the fabric base, and then subjected to vulcanizing conditions (see below).

Controlling the thickness of the resulting laser-engraveable layer can be accomplished by adjusting the pressure between calender rolls and the calendering speed. In some cases, where the elastomeric mixture does not stick to the calender rolls, the rolls are heated to improve the tackiness of the elastomeric mixture and to provide some adhesion to the calender rolls. This continuous roll of calendered material can be vulcanized in a rotacure system under desired temperature and pressure conditions. For example, the temperature can be at least 150° C. and up to and including 180° C. over a period of time varying from 2 to 15 minutes. For example, with a sulfur vulcanization system, the curing conditions are generally about 165° C. for about 15 minutes. Shorter times can be used if higher than atmospheric pressure is used. For peroxide curing systems, for example with Perkadox® 14/40 (Kayaku Akzo), the curing conditions can be about 165° C. for 4 minutes with a post curing stage at a temperature of 240° C. for 120 minutes.

The elastomeric mixture can be calendered in contact with support materials such as PET or fabric and then vulcanized as described above.

The flexographic printing precursors of this invention can be prepared in the following manner:

The laser-engraveable layer (for example as a continuous web or roll) can be laminated to a suitable support, such as a polyester support. This laser-engraveable can be ground using suitable continuous grinding apparatus to provide a uniform thickness in the continuous web or roll, which can then be cut to size to provide flexographic printing precursors of the desired sizes having two orthogonal dimensions.

To prepare flexographic printing sleeve precursors, the mechanically treated elastomeric mixture can be deposited around a sleeve core and vulcanized and ground to suitable thickness and smoothness. The mechanically treated elastomeric mixture can also be formed on the sleeve core using an extruder.

The flexographic printing precursor can also be constructed with a suitable protective layer or slip film (with release properties or a release agent) in a cover sheet that is removed prior to forming a relief image by laser engraving. Such a protective layer can be a polyester film [such as poly (ethylene terephthalate)] forming the cover sheet. A backing layer on the substrate side opposite the laser-engraveable layer can also be present. This layer can be reflective of imaging infrared radiation or transparent to it.

Some particular embodiments of the method for preparing the flexographic printing plate precursors of this invention comprise:

providing a mixture of elastomeric resins and non-metallic fibers, adding optional components (such as near-infrared radiation absorbers, vulcanizing compositions, and inorganic fillers) and compounding the resulting elastomer mixture in a two-roll mill (or combination of Banbury mill and calender), optionally providing one or more additional passes of the mechanically treated elastomeric mixture through the two-roll mill until satisfactory fiber orientation is verified by microscopic examination, applying the mechanically treated elastomeric mixture to a fabric base to provide a continuous roll of a laser-engraveable layer, causing vulcanization in the continuous roll of the laser-engraveable layer, and laminating a polyester support to the continuous laser-engraveable layer to provide a continuous flexographic printing plate precursor, and cutting it into sheets of suitable size(s).

Particular embodiments for preparing flexographic printing sleeve precursors are similar but the mechanically treated elastomeric mixture is applied to the sleeve core prior to vulcanization.

Relief Image Formation and Printing

Laser engraving can be accomplished using a near-IR radiation emitting diode or carbon dioxide or Nd:YAG laser. It is desired to laser engrave the laser-engraveable layer to provide a relief image with a minimum dry depth of at least 50 μm or typically of at least 100 μm. More likely, the minimum relief image depth is at least 300 μm and up to and including 4000 μm or up to and including 2500 μm being more desirable. Relief is defined as the difference measured between the floor of the imaged flexographic printing member and its outermost print surface. The relief image can have a maximum depth up to 100% of the original dry thickness of the laser-engraveable layer if it is disposed directly on a substrate or underlayer. In such instances, the floor of the relief image can be the substrate (if the laser-engraveable layer is completely removed in the imaged regions), a lower region of the laser-engraveable layer, or an underlayer such as an adhesive layer or compliant layer. When a substrate is absent, the relief image can have a maximum depth of up to 80% of the original dry thickness of the laser-engraveable layer. A semiconductor near-infrared radiation laser or array of such lasers operating at a wavelength of at least 700 nm and up to and including 1400 nm can be used, and a diode laser operating at from 800 nm to 1250 nm is particularly useful for laser-engraving.

Generally, laser-engraving is achieved using at least one near-infrared radiation laser engraving means having a minimum fluence (energy) level of at least 20 J/cm$^2$ at the imaged surface and typically near-infrared imaging fluence is at least 20 J/cm$^2$ and up to and including 1,000 J/cm$^2$ or typically at least 50 J/cm$^2$ and up to and including 800 J/cm$^2$.

A suitable laser engraver that would provide satisfactory engraving is described in WO 2007/149208 (Eyal et al.) that is incorporated herein by reference. This laser engraver is considered to be a "high powered" laser ablating imager or engraver and has at least two laser diodes emitting radiation in one or more near-infrared radiation wavelengths so that imaging with the one or more near-infrared radiation wavelengths is carried out at the same or different depths relative to the outer surface of the laser-engraveable layer. For example, the multi-beam optical head described in the noted publication incorporates numerous laser diodes, each laser diode having a power in the order of at least 10 Watts per emitter width of 100 μm. These lasers can be modulated directly at relatively high frequencies without the need for external modulators.

Thus, laser-engraving (laser imaging) can be carried out at the same or different relief image depths relative to the outer surface of the laser-engraveable layer using two or more laser diodes, each laser diode emitting near-infrared radiation in one or more wavelengths.

Other imaging (or laser-engraving) devices and components thereof and methods are described for example in U.S. Patent Application Publications 2008/0153038 (Siman-Tov et al.) describing a hybrid optical head for direct engraving, 2008/0305436 (Shishkin) describing a method of imaging one or more graphical pieces in a flexographic printing plate precursor on a drum, 2009/0057268 (Aviel) describing imaging devices with at least two laser sources and mirrors or prisms put in front of the laser sources to alter the optical laser paths, and 2009/0101034 (Avid) describing an apparatus for providing an uniform imaging surface, all of which publications are incorporated herein by reference. In addition, U.S. Patent Application Publication 2011/0014573 (Matzner et al.) describes an engraving system including an optical imaging head, a printing plate construction, and a source of imaging near-infrared radiation, which publication is incorporated herein by reference. U.S. Patent Application Publication 2011/0058010 (Aviel et al.) describes an imaging head for 3D imaging of flexographic printing plate precursors using multiple lasers, which publication is also incorporated herein by reference.

Thus, a system for providing flexographic printing members or pattern elements including flexographic printing plates, flexographic printing cylinders, and flexographic printing sleeves includes one or more of the laser-engraveable flexographic printing precursors or patternable elements described above, as well as one or more groups of one or more sources of imaging (laser-engraving) near-infrared radiation, each source capable of emitting near-infrared radiation (see references cited above) of the same or different wavelengths. Such imaging sources can include but are not limited to, laser diodes, multi-emitter laser diodes, laser bars, laser stacks, fiber lasers, and combinations thereof. The system can also include one or more sets of optical elements coupled to the sources of imaging (engraving) near-infrared radiation to direct imaging near-infrared radiation from the sources onto the flexographic printing precursor (see references cited above for examples of optical elements).

Engraving to form a relief image can occur in various contexts. For example, sheet-like elements can be imaged and used as desired, or wrapped around a printing sleeve core or cylinder form before imaging. The flexographic printing precursor can also be a flexographic printing sleeve precursor or flexographic printing cylinder precursor that can be imaged.

During imaging, products from the engraving can be gaseous or volatile and readily collected by vacuum for disposal or chemical treatment. Any solid debris from engraving can be collected and removed using suitable means such as vacuum, compressed air, brushing with brushes, rinsing with water, ultrasound, or any combination of these.

During printing, the resulting flexographic printing plate, flexographic printing cylinder, or printing sleeve is typically inked using known methods and the ink is appropriately transferred to a suitable substrate such as papers, plastics, fabrics, paperboard, metals, particle board, wall board, or cardboard.

After printing, the flexographic printing plate or sleeve can be cleaned and reused and a flexographic printing cylinder can be scraped or otherwise cleaned and reused as needed. Cleaning can be accomplished with compressed air, water, or a suitable aqueous solution, or by rubbing with cleaning brushes or pads.

The present invention provides at least the following embodiments and combinations thereof, but other combinations of features are considered to be within the present invention as a skilled artisan would appreciate from the teaching of this disclosure:

1. A laser-engraveable flexographic printing precursor comprising a laser-engraveable layer having two orthogonal dimensions, the laser-engraveable layer comprising one or more elastomeric resins and non-metallic fibers that are oriented in the laser-engraveable layer predominantly in one of its two orthogonal dimensions, the non-metallic fibers having an average length of at least 0.1 mm and an average diameter of at least 1 μm.

2. A patternable element comprising a relief-forming laser-engraveable layer having two orthogonal dimensions, the laser-engraveable layer comprising one or more elastomeric resins and non-metallic fibers that are oriented in the laser-engraveable layer predominantly in one of its two orthogonal dimensions, the fibers having an average length of at least 0.1 mm and an average diameter of at least 1 μm.

3. Embodiment 1 or 2 comprising non-metallic fibers that are oriented in the laser-engraveable layer predominantly in the longer of its two orthogonal dimensions.

4. Any of embodiments 1 to 3 that is in form of a continuous roll, and comprising non-metallic fibers that are oriented in the laser-engraveable layer predominantly lengthwise along the continuous roll.

5. Any of the embodiments 1 to 4 comprising carbon, mineral, or polymeric fibers that are oriented predominantly in the laser-engraveable layer predominantly in one of its two orthogonal dimensions.

6. Any of embodiments 1 to 5 wherein the laser-engraveable layer comprises polypropylene fibers, polyamide fibers, polyester fibers, phenol-formaldehyde fibers, polyurethane fibers, polyvinyl alcohol fibers, poly(vinyl chloride) fibers, carbon nanofibers, glass fibers, or basalt fibers that are oriented in the laser-engraveable layer predominantly in one of its two orthogonal dimensions.

7. Any of embodiments 1 to 6 wherein the laser-engraveable layer comprises one or more elastomeric resins, at least one of which is an EPDM elastomeric rubber.

8. Any of embodiments 1 to 7 wherein at least 60% of the non-metallic fibers that are present in the laser-engraveable layer are oriented predominantly in the longer of its two orthogonal dimensions.

9. Any of embodiments 1 to 8 wherein the non-metallic fibers have an average non-metallic fiber length of at least 0.1 mm and up to and including 15 mm and an average non-metallic fiber diameter of at least 1 μm and up to and including 100 μm.

10. Any of embodiments 1 to 9 wherein the non-metallic fibers are present in the laser-engraveable layer in an amount of at least 1 0ff and up to and including 30 phr.

11. Any of embodiments 1 to 10 wherein the non-metallic fibers are present in the laser-engraveable layer in an amount of at least 2 phr and up to and including 12 phr.

12. Any of embodiments 1 to 11 wherein the laser-engraveable layer further comprises a near-infrared radiation absorber in an amount of at least 2 phr and up to and including 90 phr.

13. Any of embodiments 1 to 12 wherein the laser-engraveable layer further comprises an infrared radiation absorber that is a conductive or non-conductive carbon black, carbon nanotubes, graphite, or graphite oxide.

14. Any of embodiments 1 to 13 wherein the laser-engraveable layer further comprises a vulcanizing composition that is selected from the group consisting of a sulfur composition, a peroxide composition, and a mixture of sulfur composition and a peroxide composition.

15. Any of embodiments 1 to 14 wherein the laser-engraveable layer comprises one or more elastomeric resins in an amount of at least 30 weight % and up to and including 80 weight %, based on laser-engraveable layer total solids.

16. Any of embodiments 1 to 15 further comprising a substrate over which the laser-engraveable is disposed.

17. Any of embodiments 1 to 16 further comprising a substrate comprising a fabric web disposed on a polyester film, and the laser-engraveable layer is disposed over the substrate.

18. Any of embodiments 1 to 17 wherein the laser-engraveable layer further comprises one or more inorganic, non-fibrous fillers selected from the group consisting of silica, calcium carbonate, magnesium oxide, talc, barium sulfate, kaolin, bentonite, zinc oxide, mica, and titanium dioxide.

19. Any of embodiments 1 to 18 wherein the laser-engraveable layer comprises at least one CLCB EPDM elastomeric rubber and optionally at least one non-CLCB EPDM elastomeric rubber or at least one non-EPDM elastomer resin.

20. Any of embodiments 1 to 19 comprising a substrate comprising a fabric on a polyester film, and the laser-engraveable layer is disposed over the substrate, wherein the laser-engraveable layer comprises:

one or more elastomeric resins in an amount of at least 40 weight % and up to and including 70 weight %, polypropylene fibers in an amount of at least 2 phr and up to and including 12 phr, a carbon black in an amount of at least 2 phr and up to and including 30 phr, a peroxide composition comprising one or more peroxides in an amount of at least 3 phr and up to and including 20 phr, and an inorganic, non-fibrous filler in an amount of at least 1 phr and up to and including 80 phr.

21. A method for providing a relief image or pattern, comprising:

laser-engraving the laser-engraveable layer of any of embodiments 1 to 20 to provide a relief image or pattern in the laser-engraveable layer having a minimum relief image depth of at least 50 μm to provide a flexographic printing member or a patterned element.

22. The method of embodiment 21 comprising laser-engraving the laser-engraveable layer using a near-infrared radiation laser engraving means.

23. The method of embodiment 21 or 22 comprising laser-engraving the laser-engraveable layer to provide a relief image having a minimum relief image depth of at least 50 μm and up to and including 2,500 μm.

24. A system for providing a flexographic printing member or patterned element, comprising:

any of embodiments 1 to 20, a source of imaging near-infrared radiation that is capable of emitting imaging near-infrared radiation and that is selected from the group consisting of a laser diode, a multi-emitter laser diode, a laser bar, a laser stack, a fiber laser, or a combination thereof, and a set of optical elements coupled to the one or more sources of imaging near-infrared radiation to direct imaging near-infrared radiation from the one or more sources of imaging near-infrared radiation onto the flexographic printing precursor or patternable element.

The following Examples are provided to illustrate the practice of this invention and are not meant to be limiting in any manner. In these examples, we compared a laser-engraveable composition prepared according to this invention (using oriented fibers) to comparative laser-engraveable compositions having no fibers, or having non-oriented fibers. These laser-engraveable compositions contained the components shown in TABLE I below.

TABLE I

| Component | Parts per hundred rubber (phr) |
| --- | --- |
| Keltan ® 2340A elastomeric resin | 60 |
| Nordel ® IP 4725P | 40 |
| Paraffin Oil | 10 |
| Silica | 30 |
| Silane | 1.25 |
| Calcium carbonate | 30 |
| Carbon black | 24 |
| Zinc Oxide | 5 |
| Stearic acid | 1 |
| HAV-2 | 2.14 |
| Trigonox ® 29-40 peroxide | 5 |
| Trigonox ® 17-40 peroxide | 3 |
| Non-IR absorptive fibers | 10 |

Components used in these examples are identified as follows:
The calcium carbonate was Socal ® 311 or Socal ® 312 that are available, for example, from Solvay Chemicals (Brussels).
The carbon black was one of the following: N 293, N 330, N 375, and N 772 that are available from Evonik Industries AG (Switzerland).
HAV-2 is the peroxide co-reagent N,N'-m-phenylene dimaleimide that is available for example, from DuPont Dow Elastomers.
Keltan ® 2340A is an elastomeric resin that is available from DSM Elastomers.
Nordel ® IP 4725P is an elastomeric resin that is available from DuPont Dow Elastomers.
The paraffin oil was a processing oil.
The basalt fibers were obtained from Basaltex (Belgium). The glass fibers (VS1304) were obtained from Owens Corning (Italy).
The silica was chosen from Aerosil ® fumed silica (Degussa), Ultrasil ® (Evonik), and Cab-O-Sil ® (Cabot Corporation).
The silane was chosen from Dynsylan ® 6498 or Si 60 that are available from Evonik Degussa Corporation.
Stearic acid is available from various commercial sources.
Trigonox ® 29-40 is 1,1-bis(t-butylperoxy)-3,3,5-trimethylcyclohexane (available, for example, from AkzoNobel).
Trigonox ® 17-40 is butyl 4,4-di(t-butylperoxy)valerate (available, for example, from AkzoNobel).

Each laser-engraveable composition was formulated into a rubber sheet having two orthogonal dimensions (lengthwise and crosswise) as described below to form a flexographic printing plate precursor. The percentage shrinkage of each flexographic printing plate precursor was measured according to the following method:

Shrinkage Method:

1) The elastomeric resin(s) and other components were mixed on a two roll mill to provide a rubber sheet to fit a 12 cm×40 cm mold.

2) The mold was preheated to 170° C.

3) Each rubber sheet was then placed into the heated mold that was then closed.

4) The mold containing the rubber sheet was then put within a press for 10 minutes.

5) After 10 minutes in the press, each rubber sheet was removed from the mold and its dimensions were measured after 24 hours of cooling.

TABLE II below shows a comparison of tensile strengths, shrinkage, modulus, and elongation for each of the flexographic printing plate precursors. Curl of the flexographic printing plate precursors was inspected visually.

TABLE II

| | Sheet Width (% shrinkage) | Sheet Length (% shrinkage) | Modulus 150 (ASTM: D-412-98a) | Elongation (ASTM: D-412-98a) |
| --- | --- | --- | --- | --- |
| Comparative Example 1 (no fibers) | 3 | 2.5 | 35 | 270 |
| Invention Example 1 (basalt fibers; lengthwise orientation) | 2.71 | 2.25 | 54 | 195 |
| Invention Example 2 (basalt fibers; crosswise orientation) | 2.08 | 3 | 48 | 235 |
| Invention Example 3 (glass fibers; lengthwise orientation) | 2.5 | 1.5 | 60 | 190 |
| Invention Example 4 (glass fibers crosswise orientation) | 1.67 | 2.5 | 52 | 210 |

It can be seen from these results that the presence of oriented fibers in the laser-engraveable composition of each inventive flexographic printing plate precursors had a significant effect on reducing shrinkage and consequently on reducing curl. The shrinkage was smaller in the dimension of fiber orientation and greater in the opposite dimension. The elongation was also significantly decreased by the presence of oriented fibers and this indicates that the oriented fibers provided strength to the flexographic printing plate precursors in the direction (dimension) of the fiber orientation.

The various flexographic printing plate precursors described were imaged to provide relief images by laser engraving using near-IR emitting lasers and then used for printing on a flexographic printing press. The imaged flexographic printing plates containing oriented fibers provided improved print quality and longer press life.

The invention has been described in detail with particular reference to certain preferred embodiments thereof, but it will be understood that variations and modifications can be effected within the spirit and scope of the invention.

The invention claimed is:

1. A laser-engraveable flexographic printing precursor comprising a laser-engraveable layer having two orthogonal dimensions, the laser-engraveable layer comprising one or more elastomeric resins and non-metallic fibers that are oriented in the laser-engraveable layer predominantly in one of its two orthogonal dimensions, the non-metallic fibers having an average length of at least 0.1 mm and an average diameter of at least 1 μm.

2. The laser-engraveable flexographic printing precursor of claim 1 comprising non-metallic fibers that are oriented in the laser-engraveable layer predominantly in the longer of its two orthogonal dimensions.

3. The laser-engraveable flexographic printing precursor of claim 1 that is in form of a continuous roll, and comprising non-metallic fibers that are oriented in the laser-engraveable layer predominantly lengthwise along the continuous roll.

4. The laser-engraveable flexographic printing precursor of claim 1 comprising carbon, mineral, or polymeric fibers that are oriented predominantly in the laser-engraveable layer predominantly in one of its two orthogonal dimensions.

5. The laser-engraveable flexographic printing precursor of claim 1 wherein the laser-engraveable layer comprises polypropylene fibers, polyamide fibers, polyester fibers, phenol-formaldehyde fibers, polyurethane fibers, polyvinyl alcohol fibers, poly(vinyl chloride) fibers, carbon nanofibers, glass fibers, or basalt fibers that are oriented in the laser-engraveable layer predominantly in one of its two orthogonal dimensions.

6. The laser-engraveable flexographic printing precursor of claim 1 wherein the laser-engraveable layer comprises one or more elastomeric resins, at least one of which is an EPDM elastomeric rubber.

7. The laser-engraveable flexographic printing precursor of claim 1 wherein at least 60% of the non-metallic fibers that are present in the laser-engraveable layer are oriented predominantly in the longer of its two orthogonal dimensions.

8. The laser-engraveable flexographic printing precursor of claim 1 wherein the non-metallic fibers have an average non-metallic fiber length of at least 0.1 mm and up to and including 15 mm and an average non-metallic fiber diameter of at least 1 µm and up to and including 100 µm.

9. The laser-engraveable flexographic printing precursor of claim 1 wherein the non-metallic fibers are present in the laser-engraveable layer in an amount of at least 1 phr and up to and including 30 phr.

10. The laser-engraveable flexographic printing precursor of claim 1 wherein the non-metallic fibers are present in the laser-engraveable layer in an amount of at least 2 phr and up to and including 12 phr.

11. The laser-engraveable flexographic printing precursor of claim 1 wherein the laser-engraveable layer further comprises a near-infrared radiation absorber in an amount of at least 2 phr and up to and including 90 phr.

12. The laser-engraveable flexographic printing precursor of claim 1 wherein the laser-engraveable layer further comprises an infrared radiation absorber that is a conductive or non-conductive carbon black, carbon nanotubes, graphite, or graphite oxide.

13. The laser-engraveable flexographic printing precursor of claim 1 wherein the laser-engraveable layer further comprises a vulcanizing composition that is selected from the group consisting of a sulfur composition, a peroxide composition, and a mixture of sulfur composition and a peroxide composition.

14. The laser-engraveable flexographic printing precursor of claim 1 wherein the laser-engraveable layer comprises one or more elastomeric resins in an amount of at least 30 weight % and up to and including 80 weight %, based on laser-engraveable layer total solids.

15. The laser-engraveable flexographic printing precursor of claim 1 further comprising a substrate over which the laser-engraveable is disposed.

16. The laser-engraveable flexographic printing precursor of claim 1 further comprising a substrate comprising a fabric web disposed on a polyester film, and the laser-engraveable layer is disposed over the substrate.

17. The laser-engraveable flexographic printing precursor of claim 1 wherein the laser-engraveable layer further comprises one or more inorganic, non-fibrous fillers selected from the group consisting of silica, calcium carbonate, barium sulfate, kaolin, bentonite, zinc oxide, mica, and titanium dioxide.

18. The laser-engraveable flexographic printing precursor of claim 1 wherein the laser-engraveable layer comprises at least one CLCB EPDM elastomeric rubber and optionally at least one non-CLCB EPDM elastomeric rubber or at least one non-EPDM elastomer resin.

19. The laser-engraveable flexographic printing precursor of claim 1 further comprises a substrate comprising a fabric on a polyester film, and the laser-engraveable layer is disposed over the substrate,
wherein the laser-engraveable layer comprises:
one or more elastomeric resins in an amount of at least 40 weight % and up to and including 70 weight %,
polypropylene fibers in an amount of at least 2 phr and up to and including 12 phr,
a carbon black in an amount of at least 2 phr and up to and including 30 phr,
a peroxide composition comprising one or more peroxides in an amount of at least 3 phr and up to and including 20 phr, and
an inorganic, non-fibrous filler in an amount of at least 1 phr and up to and including 80 phr.

20. A patternable element comprising a relief-forming laser-engraveable layer having two orthogonal dimensions, the laser-engraveable layer comprising one or more elastomeric resins and non-metallic fibers that are oriented in the laser-engraveable layer predominantly in one of its two orthogonal dimensions, the non-metallic fibers having an average length of at least 0.1 mm and an average diameter of at least 1 µm.

21. A method for providing a flexographic printing member with a relief image, comprising:
laser-engraving the laser-engraveable layer of the laser-engraveable flexographic printing precursor of claim 1 to provide a relief image in the laser-engraveable layer having a minimum relief image depth of at least 50 µm to provide a flexographic printing member.

22. The method of claim 21 comprising laser-engraving the laser-engraveable layer using a near-infrared radiation laser engraving means.

23. The method of claim 21 comprising laser-engraving the laser-engraveable layer to provide a relief image having a minimum relief image depth of at least 50 µm and up to and including 2,500 µm.

24. A system for providing a flexographic printing member, comprising:
the laser-engraveable flexographic printing precursor of claim 1,
a source of imaging near-infrared radiation that is capable of emitting imaging near-infrared radiation and that is selected from the group consisting of a laser diode, a multi-emitter laser diode, a laser bar, a laser stack, a fiber laser, or a combination thereof, and
a set of optical elements coupled to the one or more sources of imaging near-infrared radiation to direct imaging near-infrared radiation from the one or more sources of imaging near-infrared radiation onto the flexographic printing precursor.

* * * * *